Figure 1:
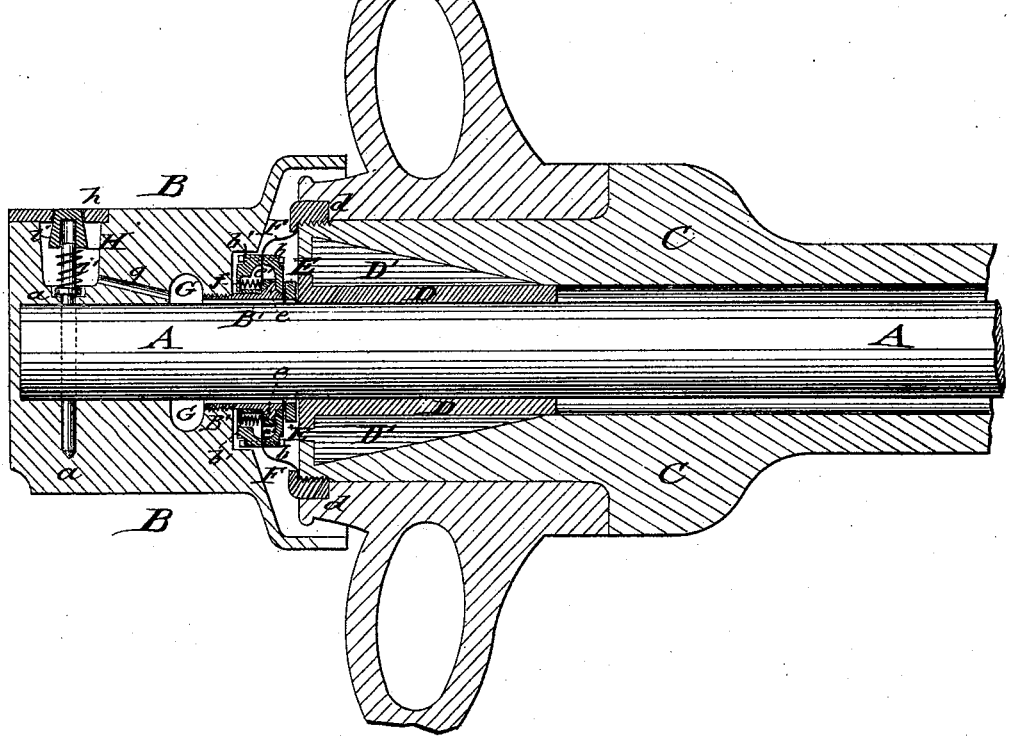
Figure 2:
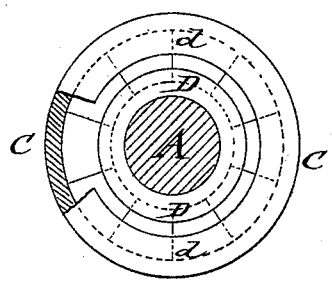

W. P. MILLS, F. BELL & J. CAREY.
LOCOMOTIVE HEAD-LIGHT.
No. 171,834. Patented Jan. 4, 1876.
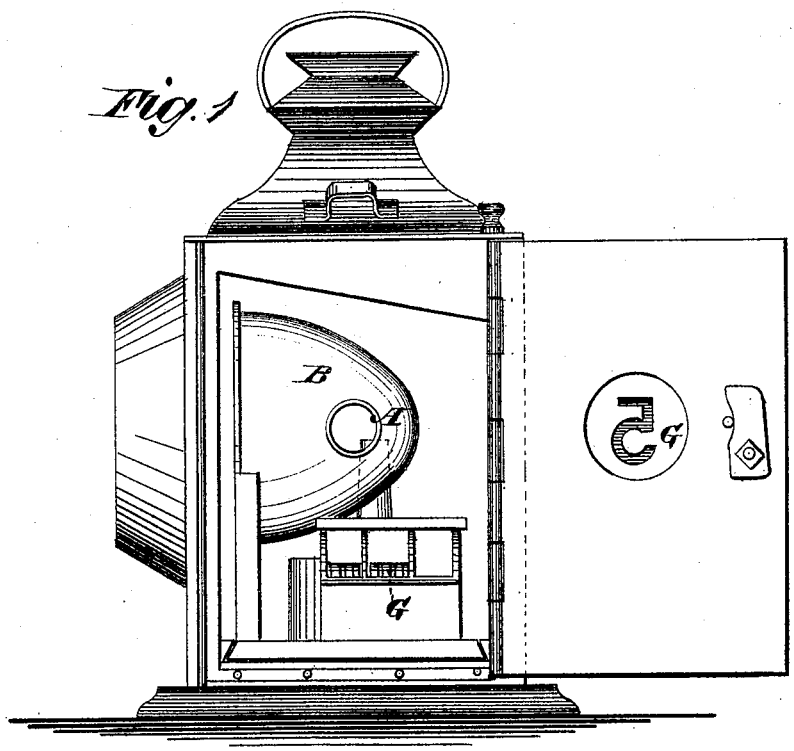
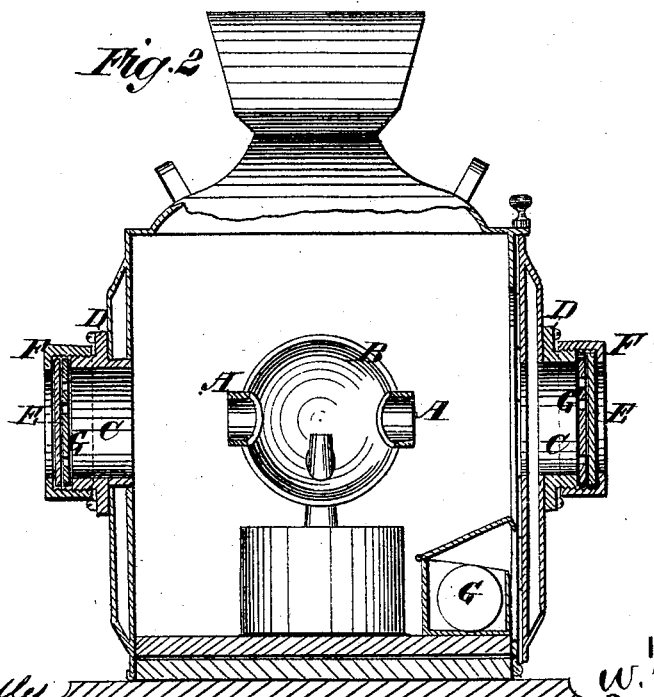

G. W. MILTIMORE.
CAR-AXLE.

No. 171,835. Patented Jan. 4, 1876.

WITNESSES:

INVENTOR:
G. W. Miltimore
BY
ATTORNEYS.